Nov. 27, 1928.
O. H. BLACKWOOD
1,692,923
RECORDING OPTICAL PYROMETER
Filed Aug. 2, 1924
2 Sheets-Sheet 1
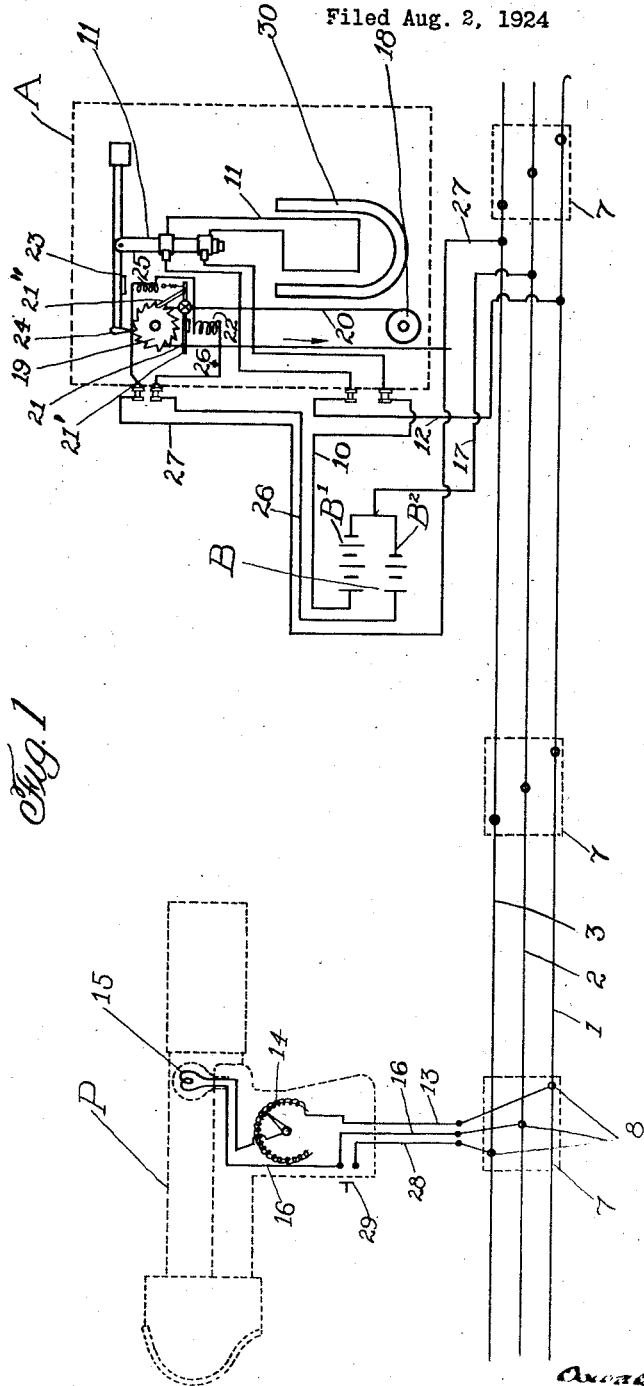
INVENTOR.
Oswald H. Blackwood
BY
ATTORNEYS.

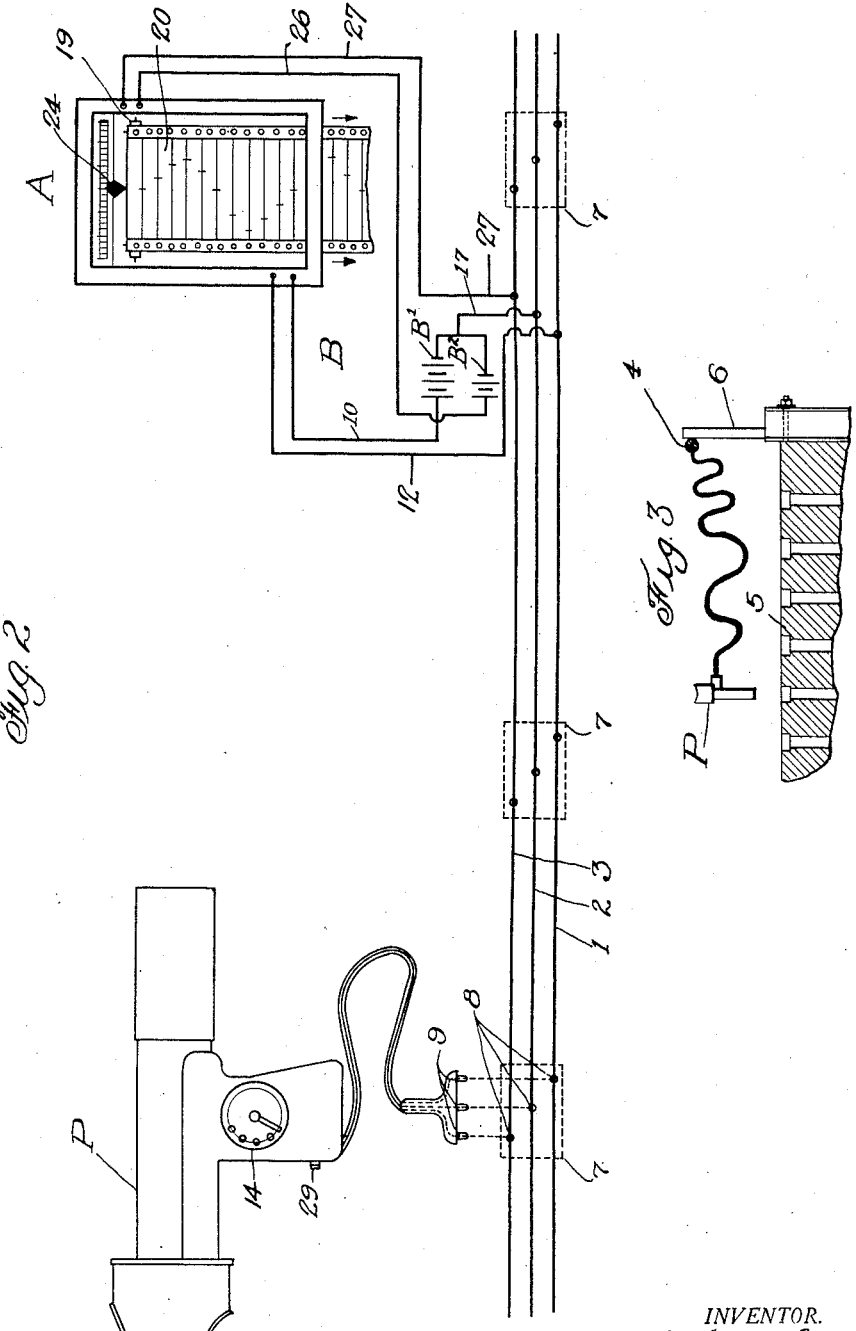

Patented Nov. 27, 1928.

1,692,923

UNITED STATES PATENT OFFICE.

OSWALD H. BLACKWOOD, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

RECORDING OPTICAL PYROMETER.

Application filed August 2, 1924. Serial No. 729,686.

Portable optical pyrometers are widely used in the determination of coke oven flue temperatures. As ordinarily constructed, the system comprises an optical pyrometer connected through a source of energy such as a battery with an indicating instrument consisting of an milliammeter, or the like. The apparatus, as a whole, is commonly moved to a position adjacent the furnace flue whose temperature is to be determined and the brightness of the pyrometer filament is adjusted by means of a rheostat to match the heated interior of the flue. The instrument is then read and the reading recorded by the operator.

My improvements contemplate the provision of a recording instrument, such as a recording milliammeter, or the like, permanently mounted outside of the inuflence of the varying flue temperatures, but bars located in a conduit extending lengthwise of the roof of the oven structure and connected at one point to the recording instrument, and a portable optical pyrometer adapted at will to be connected to the bus bars adjacent the flue whose temperature is to be determined.

My improvements further contemplate a switch preferably located on the portable pyrometer for controlling circuits to cause the recordation of the temperature on a chart simultaneously with the matching of the brightness of the filament with that of the flue contents and for stepping the chart forward one step with each recordation.

By my system I eliminate the danger of damage to the fragile milliammeter due to the rough treatment which it receives when being carried about. I also obviate the serious errors owing to temperatures coefficient which arise when the instrument is used on a heated oven top. My improvements further render it unnecessary for the operator to stop to observe and record his readings and it is therefore possible to obtain speedier and much more accurate readings than can be obtained by the old method since my record is made simultaneously with the matching of the brightness of the filament and flue interior respectively, whereas, in the former practice it was necessary for the operator to first match the brightness and thereafter take his reading. I also am enabled to make a permanent record convenient of reference and easy to read.

By moving the chart forward one step only with each recordation I obtain the advantage over a continuously actuated chart that it is unnecessary to keep the filament current constant for so long an interval of time in order to make a trace of appreciable length since by reason of the discontinuity of my record a dot made substantially instantaneously is sufficient and it may be made with the saving of material space on the chart which would be wasted were there a continuous advance of the chart between readings.

Figure 1 is a diagram of my system showing the circuit connections; Figure 2 is a somewhat similar diagram showing the pyrometer and chart with record thereon in plan; and Figure 3 is a structural view showing in section a fragmentary portion of the oven top and a possible arrangement of the conduit and pyrometer connections relative thereto.

Referring to the construction in detail, A indicates a recording milliammeter, B a battery or source of energy comprising the sections, $B^1$ and $B^2$, and P, a portable optical pyrometer. 1, 2 and 3 indicate bus bars in the conduit 4 extending along the top of the oven 5 and supported by standards 6 adjacent one side edge of the oven, the conduit being provided with receptacles 7 opposite the flue caps, the bus bars being provided with sockets 8 in the receptacles for the reception of plugs 9 on the leads extending from the pyrometer. Any other convenient arrangement of conduit along or in the roof of the oven may be employed.

The circuit for controlling the extent of rotation of the ammeter rotor proportionate to the observed temperature comprises battery section $B^1$, conductor 10 connected to the left-hand terminal thereof, rotor winding 11, conductor 12, bus bar 1, pyrometer lead 13, rheostat 14, filament 15, conductor 16, bus bar 2, conductor 17 and right-hand terminal of battery section $B^1$.

The recording attachment of the millimeter comprises the lower drum 18 and upper drum carrying a ratchet 19, supporting a chart 20, the spring retracted lever 21 pivoted at 21' and adapted to be actuated in one direction by a coil 22, galvanometer needle 23, carrying the recording pointer 24 and mounted in a conventional manner to turn with the rotor shaft 11 of the ammeter and also to oscillate in the plane of the shaft, the latter movement being controlled by the coil 25. The record controlling circuit comprises a battery section $B^2$, conductor 26 extending from the left-hand terminal thereof, coils 22 and 25, conductor 27, bus bar 3, pyrometer lead 28, switch 29, pyrometer lead 16, bus bar 2, conductor 17 and right-hand terminal of the battery section $B^2$.

While I have shown a special arrangement of battery sections and a three wire circuit as embodying a convenient manner of practicing my invention it is obvious that other arrangements of circuits and connections may be readily employed without departing from the spirit of my invention.

In the operation of the device the rheostat 14 is adjusted until the brightness of the filament 15 matches that of the flue interior. This causes the rotation of the rotor 11 of the ammeter under the influence of the rotor current, as determined by the rheostat, and the field magnet 30 to an angle proportional to the temperature of the flue, whereupon the switch 29 is closed, simultaneously effecting the energization of the coils 25 and 22 to cause respectively the pointer 24 to make a record corresponding to the current indicated and the lever 21 to be retracted, which latter upon being released by the magnet is actuated by the spring to move the dog 21'' and ratchet wheel 19 to step the chart to a new position.

The invention as hereinabove set forth is embodied in a particular form of construction but may be variously embodied within the scope of the claims hereinafter made.

I claim:

1. In a system for determining the temperature of any one of the flues of a battery of coke ovens, having an electrical measuring instrument definitely located substantially out of the influence of the varying heat of the oven flues and provided with means to make a record on a chart and to advance the chart a predetermined distance for each recordation; the combination of three-wire bus bars extending lengthwise of the oven structure, connected at one point to said electrical recording instrument; with a portable optical pyrometer provided with three leads adapted for connection to the respective bus bars at points adjacent the respective flues; a switch in one of the pyrometer leads, one of the bus bars and pyrometer leads not containing the switch serving to connect the instrument and the pyrometer in circuit with a source of energy to determine the position of the instrument indicator corresponding to the brightness of the flue being tested; the switch being adapted when depressed to close a circuit through its lead, a second bus bar and through the source of energy to cause the record to be made and the chart to be advanced; and the third bus bar and lead serving as a common return for the former circuits.

2. In combination; an electrical measuring instrument provided with means to make a record on a chart, a single, portable, optical pyrometer connected in circuit with a source of energy to control the extent of movement of the measuring instrument to correspond to the temperature of a flue being tested; and means operable at a point adjacent said pyrometer to cause said instrument to make a record for each manipulation of said latter means.

In witness whereof, I have hereunto set my hand.

OSWALD H. BLACKWOOD.